United States Patent
Rueger et al.

(10) Patent No.: US 10,012,169 B2
(45) Date of Patent: Jul. 3, 2018

(54) METHOD AND DEVICE FOR DIAGNOSING A COMPONENT IN A GAS-ROUTING SYSTEM OF AN ENGINE SYSTEM HAVING A COMBUSTION ENGINE

(71) Applicant: Robert Bosch GmbH, Stuttgart (DE)

(72) Inventors: Johannes-Joerg Rueger, Esslingen (DE); Florian Schmitt, Winnenden (DE); Udo Schulz, Vaihingen/Enz (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 15/337,165

(22) Filed: Oct. 28, 2016

(65) Prior Publication Data

US 2017/0130664 A1 May 11, 2017

(30) Foreign Application Priority Data

Nov. 6, 2015 (DE) .................. 10 2015 221 786

(51) Int. Cl.
*F02D 41/22* (2006.01)
*F02B 39/10* (2006.01)
*F02D 41/26* (2006.01)
*G01M 17/00* (2006.01)

(52) U.S. Cl.
CPC ............ *F02D 41/222* (2013.01); *F02B 39/10* (2013.01); *F02D 41/26* (2013.01)

(58) Field of Classification Search
CPC ......... F02D 41/222; F02D 41/26; F02B 39/10
USPC ................................ 701/34.4, 36, 29.1, 29.2
See application file for complete search history.

(56) References Cited

U.S. PATENT DOCUMENTS

| | | | |
|---|---|---|---|
| 7,958,874 B2* | 6/2011 | Kobayashi | F02M 26/26 123/568.12 |
| 2002/0161495 A1* | 10/2002 | Yamaki | B60T 17/22 701/33.9 |
| 2008/0184974 A1* | 8/2008 | Kobayashi | F02M 26/26 123/568.12 |

* cited by examiner

*Primary Examiner* — Gertrude Arthur Jeanglaude
(74) *Attorney, Agent, or Firm* — Norton Rose Fulbright US LLP; Gerard Messina

(57) ABSTRACT

A method for diagnosing a component in a gas-routing system of a supercharged combustion engine having an electrically operable compressor, the method including activating the electrically operable compressor after the combustion engine has been shut off, opening a flow path through the gas-routing system, measuring a state variable in the gas-routing system, and detecting a fault of the component as a function of the measured state variable.

19 Claims, 2 Drawing Sheets

METHOD AND DEVICE FOR DIAGNOSING A COMPONENT IN A GAS-ROUTING SYSTEM OF AN ENGINE SYSTEM HAVING A COMBUSTION ENGINE

CROSS REFERENCE

The present application claims the benefit under 35 U.S.C. § 119 of German Patent Application No. DE 102015221786.8 filed on Nov. 6, 2015, which is expressly incorporated herein by reference in its entirety.

FIELD

The present invention relates to supercharged combustion engines having electrically operable compressors. In particular, the present invention relates to methods for operating electrically operable compressors in supercharged combustion engines for the diagnosis of components in a gas-routing system of an engine system having a combustion engine.

BACKGROUND INFORMATION

In the course of downsizing supercharged combustion engines, the effect of the dynamic run-up delay of supercharger devices is intensified in a torque demand, the so-called turbo lag. One possible measure therefore consists of using electrically operable compressors instead of exhaust-gas-driven supercharger devices, or it consists of providing exhaust-gas-driven supercharger devices with electrical supplementary drives. Owing to the usually rapid response time of the electrically operable compressors, the build-up in charge pressure is able to take place significantly faster. The use of an electrically operable compressor allows for a power-oriented configuration of the supercharging operation, so that a clear increase in the specific power is able to be achieved.

The electrically operable compressor may be integrated into the charge-air path downstream from the intercooler, so that the volume to be compressed is as low as possible downstream from the electrically operable compressor.

In the case of exhaust-gas-driven supercharger devices featuring integrated electrical supplementation, referred to as cross chargers, the electrically operable compressor may be realized by an electrical supplementary drive provided at the mechanical coupling between an exhaust-gas turbine and the compressor, so that, in addition or as an alternative to the exhaust-gas enthalpy converted into mechanical energy, electrical energy can also be provided for driving the compressor.

SUMMARY

According to the present invention, a method for the diagnosis of a component in a gas-routing system of a supercharged combustion engine, as well as the device and the engine system, are provided.

According to a first aspect, a method is provided for diagnosing a component in a gas-routing system of a supercharged combustion engine having an electrically operable compressor, the method having the following steps:

After the combustion engine has been shut off, activation of the electrically operable compressor,
Opening of a flow path through the gas-routing system,
Measuring a state variable in the gas-routing system,
Determining a fault of the component as a function of the measured state variable.

Because of the emission-control legislation for simplifying the maintenance of engine systems in motor vehicles, a search for faults down to the component level is desirable. Such diagnoses of components are frequently derived on the basis of system reactions from causal chains. Especially in the case of positioning sensors as components in the gas-routing system of an engine system having a combustion engine, the diagnoses are performed in such a way that the positioning accuracy, the positioning rate and the positioning range of the positioning sensor are checked. Furthermore, when sensors are involved as components, the sensor performance, the signal noise and the like are to be checked.

These diagnosis methods frequently require operating states in which the emissions of the combustion engine worsen. However, the objective is to perform the diagnoses without interfering in the operation of the combustion engine to any significant degree or without worsening the exhaust-gas emissions.

According to an example embodiment of the present invention, the electrically operable compressor is activated after the combustion engine has been shut off, be it after the end of operation or after a shut-off due to a start-stop sailing operation or because of purely electric driving in the case of hybrid vehicles, in order to thereby induce a predefined gas flow in the gas-routing system of the engine system. The reaction of the components installed in the gas-routing system to the fresh air flow or the gas flow that is induced by the electrically operable compressor may be evaluated and used for diagnosing the proper functioning of the respective component.

Furthermore, the opening of the flow path through the gas-routing system may encompass a simultaneous opening of an inlet valve and outlet valve of a cylinder of the combustion engine and/or the opening of an exhaust-gas recirculation valve in an exhaust-gas recirculation line.

It may be provided that the opening of a flow path through the gas-routing system includes an opening of a throttle valve and/or an opening of an exhaust-gas backpressure flap and/or an adjustment of a supercharger actuator of a supercharger device and/or an opening of a low-pressure exhaust-gas recirculation valve in a low-pressure exhaust-gas recirculation line.

According to one specific embodiment, the electrically operable compressor can be activated immediately after the combustion engine has been shut off or after an activation-delay time has elapsed.

Furthermore, the electrically operable compressor can be activated to provide a predefined power, the fault of the component being detected if the value of the measured state variable deviates by more than a predefined tolerance amount from a certain specification, which is determined in particular as a function of the predefined power of the electrically operable compressor and possibly an operating point of the combustion engine. By actuating the electrically operable compressor at the predefined power, a defined gas flow is able to be achieved in the gas-routing system, which in the fault-free case, leads to a specific value of the state variable indicated by the specification.

In particular, the component may correspond to an air-mass meter in the air-supply system of the combustion engine.

According to a further specific embodiment, the electrically operable compressor may be activated to provide a temporal sequence of at least two different predefined powers, the fault of the component being detected if the change in the values of the state variables measured at the different powers deviates by more than a predefined tolerance amount from a specification, which is determined in particular with the aid of the change in the predefined power and possibly as a function of an operating point of the combustion engine. By sequentially actuating the electrically operable compressor at different predefined powers, it is possible to achieve correspondingly different defined gas flows in the gas-routing system, which in the fault-free case, lead to a specific change in the values of the state variable indicated by the specification.

The positioning sensor in particular may correspond to a temperature sensor for measuring an exhaust-gas temperature, to a differential-pressure sensor on a particle filter in an exhaust-gas system of the combustion engine, or it may correspond to a lambda probe.

It may be provided that the electrically operable compressor is activated to provide a predefined power, a positioning sensor in the gas-routing system being sequentially set to a first position and to a second position, and the fault of the component is detected if the change in values of the state variables measured at the different positions of the positioning sensor deviates by more than a predefined tolerance amount from a specification, which is determined in particular with the aid of the change between the first and the second position and possibly as a function of an operating point of the combustion engine.

Furthermore, the positioning sensor may correspond to the component that is to be diagnosed, the positioning sensor in particular corresponding to a throttle valve in the air-supply system, to inlet and outlet valves or to an exhaust-gas backpressure flap.

As an alternative, the component that is to be diagnosed may correspond to a sensor for measuring the state variable.

According to one specific embodiment, a fault of the electrically operable compressor may be detected if it is detected during the execution of diagnoses of a plurality of components in the gas-routing system that a fault has occurred simultaneously.

According to another aspect, a device for diagnosing a component in a gas-routing system of a supercharged combustion engine having an electrically operable compressor is provided, the device being developed to Activate the electrically operable compressor after the combustion engine has been shut off,
Open a flow path through the gas-routing system,
Measure a state variable in the gas-routing system,
Detect a fault of the component as a function of the measured state variable.

BRIEF DESCRIPTION OF THE DRAWINGS

Specific embodiments are described in greater detail below with the aid of the figures.

DETAILED DESCRIPTION OF EXAMPLE EMBODIMENTS

Figure 1:
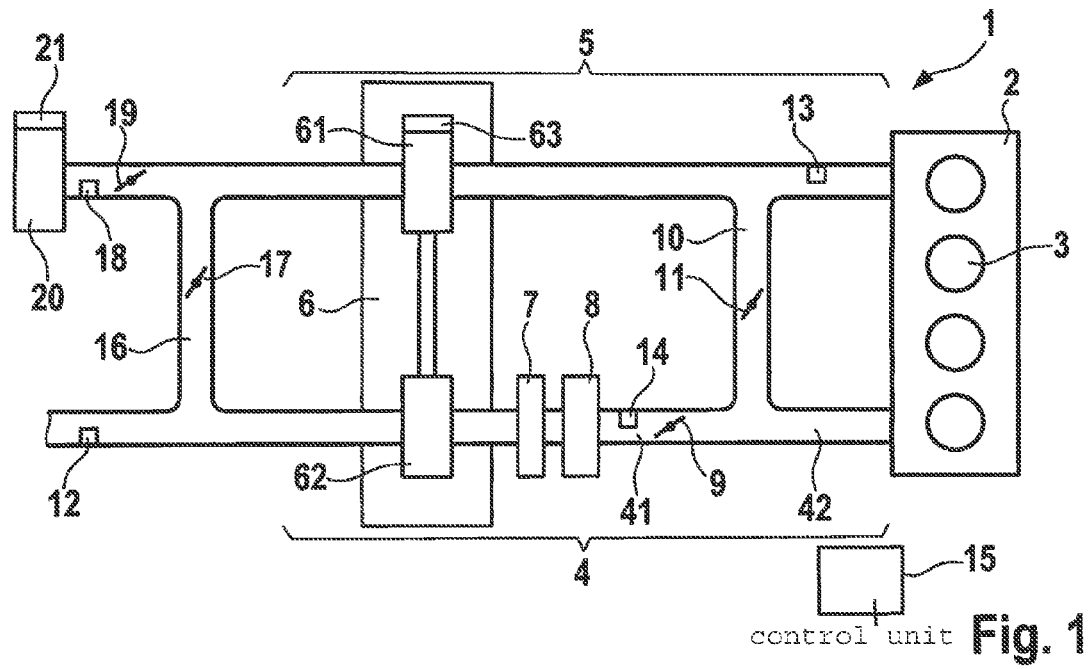
FIG. 1 shows a schematic representation of an engine system having an exhaust-gas-driven supercharger device and an additional compressor which is operable purely electromotively.

FIG. 1 shows an engine system 1 having a combustion engine 2, which has a number of cylinders 3. In this particular exemplary embodiment, four cylinders 3 are provided by way of example. Combustion engine 2 may be developed as a diesel or an Otto engine.

Ambient air is supplied to combustion engine 3 in a conventional manner via an air-supply system 4, and combustion exhaust gas is carried away from cylinders 3 via an exhaust-gas system 5. A supercharger device 6 may be provided, which has an exhaust-gas turbine 61 in exhaust-gas system 5 and a compressor 62 in air-supply system 4. Turbine 61 is mechanically coupled with compressor 62, so that exhaust-gas enthalpy that is converted into mechanical energy in turbine 61 is used for compressing ambient air, taken from the environment, in compressor 62. A supercharger actuator 63 is able to adjust the portion of exhaust-gas enthalpy converted into mechanical energy.

An intercooler 7 may be provided downstream from compressor 62. An additional, purely electrically operable compressor 8 may be situated downstream from intercooler 7, in order to supply charge air under a charge pressure in an intake-manifold section 41 of air-supply system 4. The charge pressure in charge-air section 41 results from the compression powers of compressor 62 and of the additional, purely electrically operated compressor 8. An optional charge-pressure sensor 14, for example, is able to measure the charge pressure.

Charge-air section 41 is delimited by a throttle valve 9 in the downstream direction. An intake-manifold section 42 of air-supply system 4 is situated between throttle valve 9 and inlet valves (not shown) of cylinders 3 of combustion engine 2. An air-mass meter 12 may be provided upstream from compressor 62.

An exhaust-gas recirculation line 10 leads into intake-manifold section 42 between a section of exhaust-gas system 5 that is situated between outlet valves (not shown) of cylinders 3 of combustion engine 2 and turbine 61. An exhaust-gas recirculation valve 11 may be situated in exhaust-gas recirculation line 10 in order to allow an adjustment of the level of the recirculated exhaust-gas mass flow.

In addition, a low-pressure exhaust-recirculation line 16 may be provided, which connects a section of exhaust-gas system 5 that is located on the output side of turbine 61 to a section of air-supply system 4 that is located on the input side of compressor 62. A low-pressure exhaust-gas recirculation valve 17 may be situated in low-pressure exhaust-gas recirculation line 16 in order to be able to adjust the level of the recirculated exhaust-gas mass flow. An exhaust-backpressure flap 19 is provided downstream from the branch-off of low-pressure exhaust-gas recirculation line 16 from exhaust-gas system 5 in order to increase the exhaust-gas counterpressure for the low-pressure exhaust-gas recirculation.

In addition, a lambda probe 18 may be provided in exhaust-gas system 5, which measures the air-fuel ratio of the air-fuel mixture combusted in cylinders 3 in a conventional manner. It is also possible to provide one or more additional lambda probes (not shown) in exhaust-gas system 5.

Moreover, a particle filter 20 may be provided on the output side of turbine 61 in order to filter particles out of the combustion exhaust gas. Particle filter 20 may be equipped with a differential-pressure sensor 21 in order to determine a particulate load.

A control unit 15 is provided, which operates combustion engine 2 in a conventional manner by adjusting the positioning sensors such as throttle valve 9, supercharger actuator 63 on turbine 61, exhaust-gas recirculation valve 11 and the like according to a current operating state of combustion engine 2 and according to a specification, such as a torque command of the driver.

Figure 2:
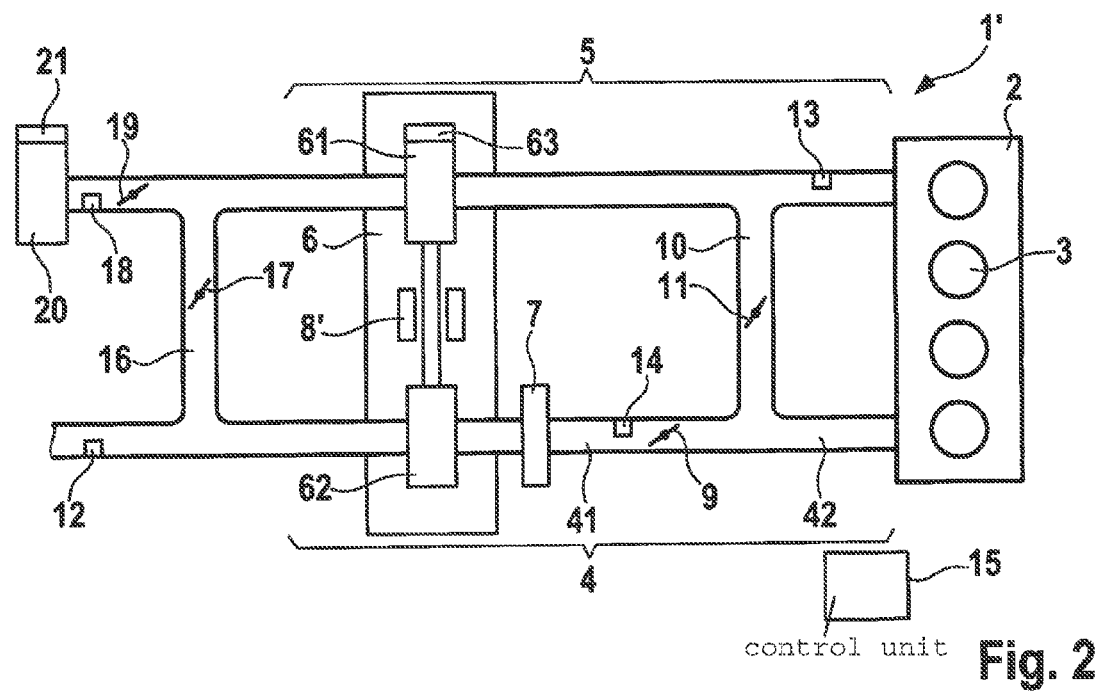
FIG. 2 shows a schematic representation of a further engine system having an exhaust-gas-driven supercharger device including an electromotively operable compressor.

FIG. 2 shows an alternative engine system 1'. Identical components or components having an identical function have been provided with identical reference numerals in the figure. In contrast to engine system 1, no additional, purely electrically operable compressor is provided in engine system 1'. Instead, the electrically operable compressor is provided with the aid of a supplementary drive 8' in supercharger device 6, which is able to introduce additional mechanical energy via the mechanical coupling between turbine 61 and compressor 62, so that compressor 62 is also able to be operated independently of mechanical energy provided by the turbine. In the specific embodiment of FIG. 2, the electrically operable compressor is formed by supplementary drive 8' and compressor 62 and is also referred to as cross charger.

In an alternative specific embodiment, the engine system has no exhaust-gas-driven supercharger device, but only an electrically operable compressor.

Figure 3:
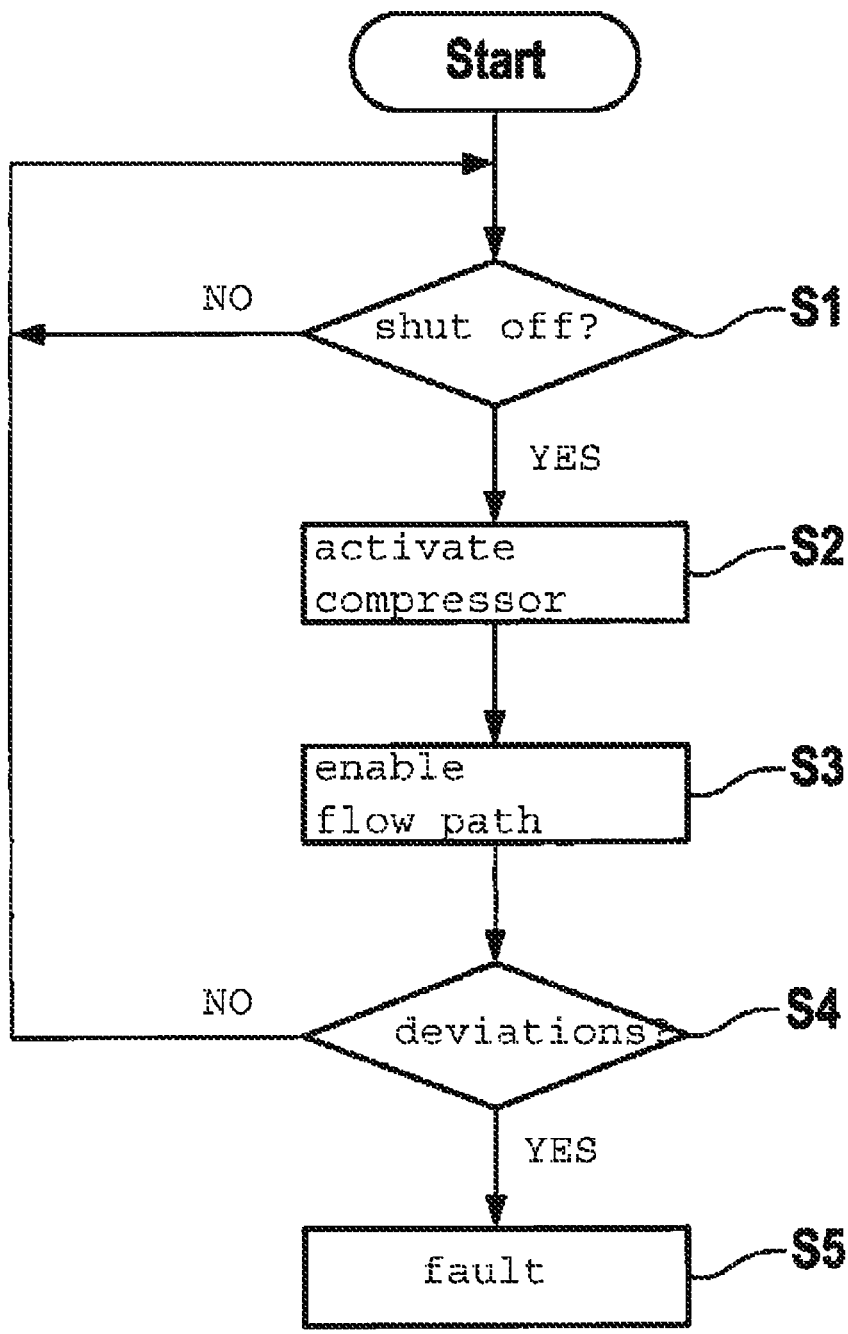
FIG. 3 shows a schematic representation of a flow diagram to illustrate a method for diagnosing a component in a gas-routing system of an engine system having a combustion engine.

In the flow diagram of FIG. 3, the method for carrying out a diagnosis of a component in the gas-routing system is explained in principle.

In step S1, it is first checked whether the combustion engine has been shut off. If this is the case (alternative: yes), then the method continues with step S2; otherwise, a return to step S1 takes place. The shutting off of the combustion engine can take place as a result of an end of operation, e.g., the driver of the motor vehicle operating the ignition key and removing it, as a result of an automatic shut-off by a start-stop sailing-operation function, or as a result of a shut-off of the combustion engine in purely electric driving in the case of hybrid vehicles. Furthermore, it is possible to monitor the engine speed and a shut-off combustion engine may be identified if an engine speed of 0 is detected in a vehicle standstill and/or with an open drive train.

In step S2, electrically operable compressor 8, 8' is now activated or continues to be actively operated directly following the shut-off of the combustion engine, in order to thereby create an air flow through the gas-routing system. As an alternative, the activation of the electrically operable compressor 8, 8' may also take place after a predefined activation-delay time has elapsed, or the electrically operable compressor may be turned off when the combustion engine is shut off, as the case may be, in order to then be switched on again after the activation-delay time has elapsed.

The actuation of the electrically operable compressor 8, 8' may take place in a constant manner at a power predefined by the diagnosis to be executed, or it may be carried out in a variable manner at a predefined temporal variation according to a level or characteristic specified by the diagnosis to be performed. For instance, the electrically operable compressor 8, 8' is able to be sequentially actuated at two different powers, which lead to different rotational speeds of the compressor and thus to different gas flows in the gas-routing system. Subsequently, a value of one or more state variable(s) or characteristics of one or more state variable(s) may be detected:

If the gas routing in the gas-routing system is brought to a certain flow state featuring a constant gas flow, then a respective value of one or more state variable(s) is able to be detected.

If the gas routing in the gas-routing system is actuated in a temporally variable manner by actuating the electrically operable compressor in a predefined way, then this temporal change is able to be detected with the aid of one or more characteristic(s) of one or more state variable(s).

When the gas routing in the gas-routing system is brought to a specific flow state featuring a constant gas flow, then it is alternatively possible to additionally modify a property of the air flow such as the temperature, the pressure and the like in a certain region in the gas-routing system by varying a positioning sensor as component in the gas-routing system. One or more characteristic(s) of one or more state variable(s) is/are able to be detected accordingly.

Generally at the same time, a flow path through the gas-routing system is enabled in step S3, so that a gas flow through the gas-routing system can come about. The flow path may be enabled by the simultaneous opening of inlet and outlet valves on combustion engine 2 and/or by opening an exhaust-gas recirculation valve 11 for opening exhaust-gas recirculation line 10. Fresh air is normally aspirated by air-supply system 4 in the process, and the fresh-air flow is expelled again by exhaust-gas system 5.

Instead of routing fresh air through open exhaust-gas recirculation line 10 and/or through combustion engine 2 which is open as a result of open inlet and outlet valves on a cylinder 3, and to discharge the fresh air into the environment via exhaust-gas system 5, it is also possible to circulate gas in the gas-routing system through the electrically operable compressor provided a low-pressure exhaust-gas recirculation is available.

In step S4, the detected one value or the plurality of values of the one or the multiple state variables and/or the detected one or more characteristics of the values of the one or multiple state variable(s) may be compared to corresponding operating-point-dependent specifications specified by the diagnosis, and a check may be carried out as to whether they match the specifications, in particular while taking a tolerance into account. If deviations are detected (alternative: yes), then a fault may be signaled in step S5. Otherwise (alternative: no), a return to step S1 takes place.

As an example of a component in the gas-routing system, a diagnosis of air-mass meter 12, which is situated upstream from supercharger device 6, may be performed. After engine system 1, 1' has been shut off, throttle valve 9 in air-supply path 4 of combustion engine 2, inlet and outlet valves on at least one of cylinders 3 and/or exhaust-gas recirculation valve 11 in exhaust-gas recirculation line 10 are opened and possible regulating flaps in exhaust-gas system 5 are opened for this purpose, so that a defined gas-flow path is opened or created. Electrically operable compressor 8, 8' is driven at a predefined power, the power usually corresponding to a certain compressor speed. Since the air-mass flow delivered by electrically operable compressor 8, 8' is proportional to the compressor speed of electrically operable compressor 8, 8' and depends on a pressure ratio between the output-side and input-side pressure at compressor 8, 8', the delivered air-mass flow through the gas-routing system is known in an actuation of electrically operable compressor 8, 8' at a specific electrical power, and/or it can be ascertained with the aid of a specified compressor program map. A setpoint air-mass flow at a power specified for the compressor by the diagnosis method and given the predefined gas-flow path can be specified with the aid of a diagnosis program map for the air-mass meter (e.g., set up via a calibration measurement), in particular as a function of the instantaneous ambient air temperature and the instantaneous ambient pressure, and compared to the air-mass flow measured by the air-mass meter. In the case of deviations, a fault may be identified while taking a tolerance into account.

Furthermore, a variation of one or more regulating flap(s) from a respective first position to a second position while electrically operable compressor 8, 8' is activated may lead to changes in one or more value(s) of one or more state variable(s) in areas of the gas-routing system. Ascertaining the changes in the values of the one or more state variable(s) and then comparing them to a predefined setpoint sensor-value change thus makes it possible to determine the proper functioning of the respective regulating flaps. A fault may be identified in the case of deviations while taking a tolerance into account.

For example, it is possible to diagnose the proper functioning of throttle valve 9 as regulating flap in this way by measuring the charge pressures or intake-manifold pressures that come about in the first position and the second position, with the aid of a charge-pressure sensor 14 or an intake-manifold pressure sensor, and to analyze the resulting pressure changes of the charge pressure or the intake-manifold pressure in comparison with a predefined setpoint charge-pressure change or a predefined setpoint intake-manifold pressure change.

Moreover, if an exhaust-gas backpressure flap 19 and a low-pressure exhaust-gas recirculation are provided, it is possible to close exhaust-gas backpressure flap 19, so that in an actuation of electrically operable compressor 8, 8' at a predefined power the gas flow circulates through engine system 1, 1' at a known gas flow rate when low-pressure exhaust-gas recirculation valve 17 is open. If low-pressure exhaust-gas recirculation valve 17 is closed, then a measurable pressure change may be generated in exhaust-gas system 5, i.e. downstream from electrically operable compressor 8, 8'. If the resulting pressure change deviates from a setpoint-pressure change specified by a corresponding diagnosis program map, a fault of low-pressure exhaust-gas recirculation valve 17 may be detected.

In addition, a temperature sensor 13 in exhaust-gas system 5 is able to be checked. In particular when fresh air is guided through the gas-routing path after combustion engine 2 has been shut off and electrically operable compressor 8, 8' has been switched on at a predefined power, the temperature in exhaust-gas system 5 will approach the ambient temperature of the ambient air. The drop in temperature in the gas-routing system, which is able to be ascertained from a characteristic of the temperature values measured by a respective temperature sensor 13, will then approach the temperature of the ambient air according to a time constant. If temperature sensor 13 detects a characteristic of the temperature values that deviates from the temperature drop to be anticipated, then a fault of said temperature sensor 13 may be inferred.

In addition, the functioning of lambda probe 18 disposed on the output side of turbine 61 of supercharger device 6 in exhaust-gas system 5 is able to be diagnosed. Immediately after combustion engine 2 has been shut off, exhaust gas still remains in exhaust-gas system 5 between combustion engine 2 and lambda probe 18. Given a defined gas-flow path, it is now possible to activate electrically operable compressor 8, 8' at a predefined power, i.e. at a predefined gas flow rate. On account of the supplied fresh air, the gas that is flowing past the lambda probe will become leaner, i.e., the oxygen content of the gas passing along the lambda probe will increase. By comparing the characteristic of the lambda value detected by lambda probe 18 to a predefined setpoint characteristic of the lambda value, which is specified according to a diagnosis program map for the lambda value (at a predefined power of compressor 8, 8'), or which results from a known time constant of the overall system for measuring the lambda value once combustion engine 2 has been shut off, it can be determined whether lambda probe 18 measures the lambda value correctly. A fault of lambda probe 18 may be inferred if a deviation from the predefined characteristic of the lambda value of the gas flowing past lambda probe 18 is detected after starting electrically operable compressor 8, 8'.

Furthermore, the proper functioning of purely electrically operated inlet or outlet valves (not shown) of combustion engine 2 is able to be diagnosed. For example, in the case of an electrically operable compressor 8, 8' that is activated following a shut-off of combustion engine 2, the functioning of the inlet or outlet valves is able to be detected by a defined opening and closing on the basis of the backpressure in air-supply system 4. A change in the gas flow in air-supply system 4 is able to be detected by a pressure change or by a change in an air-mass flow that results from the state change in air-supply system 4 prior to and following the defined opening and closing of the inlet or outlet valves. The proper functioning of the inlet or outlet valves can be checked by comparing the changes in the air-mass flow and/or the pressure in air-supply system 4 to a predefined corresponding setpoint-change value that results from a predefined diagnosis program map for the change in the air-mass flow and/or the pressure in air-supply system 4 when the inlet valves and outlet valves are actuated. In the case of deviations, a fault may be detected while taking a tolerance into account.

In addition, by closing exhaust-gas backpressure flap in exhaust-gas system 5, a backpressure in the gas-routing system (e.g., in a non-existent or closed low-pressure exhaust-gas recirculation) that leads to a specific charge pressure is able to be generated for the diagnosis of an exhaust-gas backpressure flap 19. This may be measured with the aid of charge-pressure sensor 14. Given a defined gas-flow path and an actuation of electrically operable compressor 8, 8' at a predefined compressor power while combustion engine 2 is shut off, a charge pressure is obtained that is a function of the position of exhaust-gas backpressure flap 19. The measured charge pressure may be compared to a setpoint charge pressure predefined as a function of the position of exhaust-gas backpressure flap 19, which results from a diagnosis program map for the diagnosis of exhaust-gas backpressure flap 19. In the case of deviations, a fault of exhaust-gas backpressure flap 19 may be detected while taking a tolerance into account.

In addition, a proper functioning of a differential-pressure sensor for particle filter 20, mounted on the output side of turbine 61, may be diagnosed by a sequential actuation of electrically operable compressor 8, 8' at two different powers while combustion engine 2 is shut off. If no increase in a differential pressure of the differential-pressure sensor results in response to an increase in the gas flow, then a fault of the differential-pressure sensor may be inferred.

In addition, a proper functioning of electrically operable compressor 8, 8' is able to be checked, in particular in that a simultaneous fault has been detected in the diagnoses of multiple positioning sensors. Since a simultaneous failure of multiple components in the gas-routing system is unlikely, a fault of electrical compressor 8, 8' or its actuation may be inferred if multiple faulty components are detected.

What is claimed is:

1. A method for diagnosing a component in a gas-routing system of a supercharged combustion engine having an electrically operable compressor, the method comprising:
   after the combustion engine has been shutoff and while the combustion engine is shutoff, performing:
   (i) activating the electrically operable compressor;
   (ii) opening a flow path through the gas-routing system;
   (iii) measuring a state variable in the gas-routing system, the state variable being at least one of: (i) an air mass-flow in the gas-routing system, (ii) a pressure in the gas-routing system, (iii) a temperature in the gas-routing system, and (iv) a lambda value in the gas-routing system; and
   (iv) determining a fault of the component as a function of the measured state variable.

2. The method as recited in claim 1, wherein the opening of the flow path through the gas-routing system includes at least one of: i) a simultaneous opening of an inlet valve and outlet valve of a cylinder of the combustion engine, and ii) an opening of an exhaust-gas recirculation valve in an exhaust-gas recirculation line.

3. The method as recited in claim 1, wherein the opening of a flow path through the gas-routing system includes at least one of: i) an opening of a throttle valve, an opening of an exhaust-gas backpressure flap, an adjustment of a supercharger actuator of a supercharger device, and an opening of a low-pressure exhaust-gas recirculation valve in a low-pressure exhaust-gas recirculation line.

4. The method as recited in claim 1, wherein the electrically operable compressor is activated immediately after the combustion engine has been shut off or after an activation-delay time has elapsed.

5. The method as recited in claim 1, wherein the electrically operable compressor is activated to provide a predefined power, a fault of the component being detected if the value of the measured state variable deviates by more than a predefined tolerance amount from a certain specification, which is determined as a function of the predefined power of the electrically operable compressor.

6. The method as recited in claim 1, wherein the electrically operable compressor is activated to provide a predefined power, a fault of the component being detected if the value of the measured state variable deviates by more than a predefined tolerance amount from a certain specification, which is determined as a function of the predefined power of the electrically operable compressor and an operating point of the combustion engine.

7. The method as recited in claim 5, wherein the component corresponding to an air-mass meter in an air-supply system of the combustion engine.

8. The method as recited in claim 1, wherein the electrically operable compressor is activated to provide a temporal sequence of at least two different predefined powers, a fault of the component being detected if the change in the values of the state variables measured at the different powers deviates by more than a predefined tolerance amount from a specification, which is determine with the aid of the change in the predefined power.

9. The method as recited in claim 1, wherein the electrically operable compressor is activated to provide a temporal sequence of at least two different predefined powers, a fault of the component being detected if the change in the values of the state variables measured at the different powers deviates by more than a predefined tolerance amount from a specification, which is determine with the aid of the change in the predefined power and as a function of an operating point of the combustion engine.

10. The method as recited in claim 1, wherein the electrically operable compressor is activated to provide a predefined power, a positioning sensor in the gas-routing system being sequentially set to a first position and to a second position, the fault of the component being detected if the change in values of the state variables measured at the different positions of the positioning sensor deviates by more than a predefined tolerance amount from a specification which is determined with the aid of the change between the first and the second position.

11. The method as recited in claim 10, wherein the positioning sensor corresponds to a temperature sensor for measuring an exhaust-gas temperature, a differential-pressure sensor on a particle filter in an exhaust-gas system of the combustion engine or to a lambda probe.

12. The method as recited in claim 1, wherein the electrically operable compressor is activated to provide a predefined power, a positioning sensor in the gas-routing system being sequentially set to a first position and to a second position, the fault of the component being detected if the change in values of the state variables measured at the different positions of the positioning sensor deviates by more than a predefined tolerance amount from a specification which is determined with the aid of the change between the first and the second position and as a function of an operating point of the combustion engine.

13. The method as recited in claim 12, wherein the positioning sensor corresponds to the component that is to be diagnosed, the positioning sensor corresponding to a throttle valve in the air-supply system, inlet and outlet valves or an exhaust-gas backpressure flap.

14. The method as recited in claim 12, wherein the component that is to be diagnosed corresponds to a sensor for measuring the state variable.

15. The method as recited in claim 1, wherein a fault of the electrically operable compressor is determined if it is detected in the execution of diagnoses of multiple components in the gas-routing system that a fault has occurred simultaneously.

16. A device for diagnosing a component in a gas-routing system of a supercharged combustion engine having an electrically operable compressor, the device being designed to:
   after the combustion engine has been shutoff and while the combustion engine is shutoff, the device designed to:
   (i) activate the electrically operable compressor;
   (ii) open a flow path through the gas-routing system;
   (iii) measure a state variable in the gas-routing system, the state variable being at least one of: (i) an air mass-flow in the gas-routing system, (ii) a pressure in the gas-routing system, (iii) a temperature in the gas-routing system, and (iv) a lambda value in the gas-routing system; and
   (iv) detect a fault of the component as a function of the measured state variable.

17. An engine system, comprising:
   a combustion engine;
   an electrically operable compressor; and
   a device for diagnosing a component in a gas-routing system of the combustion engine having an electrically operable compressor, the device being designed to, after the combustion engine has been shutoff and while the combustion engine is shutoff: (i) activate the electrically operable compressor, (ii) open a flow path through the gas-routing system, (iv) measure a state variable in the gas-routing system, and cv) detect a fault of the component as a function of the measured state variable, wherein the state variable is at least one of: (i) an air mass-flow in the gas-routing system, (ii) a pressure in the gas-routing system, (iii) a temperature in the gas-routing system, and (iv) a lambda value in the gas-routing system.

18. A non-transitory machine-readable storage medium on which is stored a computer program for diagnosing a component in a gas-routing system of a supercharged combustion engine having an electrically operable compressor, the computer program, when executed by a processor, causing the processor to perform:

after the combustion engine has been shutoff and while the combustion engine is shutoff, the processor performing:

(i) activating the electrically operable compressor;

(ii) opening a flow path through the gas-routing system;

(iii) measuring a state variable in the gas-routing system, the state variable being at least one of: (i) an air mass-flow in the gas-routing system, (ii) a pressure in the gas-routing system, (iii) a temperature in the gas-routing system, and (iv) a lambda value in the gas-routing system; and (iv) determining a fault of the component as a function of the measured state variable.

19. An electronic control unit, which has non-transitory electronic storage medium on which is stored a computer program for diagnosing a component in a gas-routing system of a supercharged combustion engine having an electrically operable compressor, the computer program, when executed by electronic control unit, causing the electronic control unit to perform:

after the combustion engine has been shutoff and while the combustion engine is shutoff, the electronic control unit performing:

(i) activating the electrically operable compressor;

(ii) opening a flow path through the gas-routing system;

(iii) measuring a state variable in the gas-routing system, the state variable being at least one of: (i) an air mass-flow in the gas-routing system, (ii) a pressure in the gas-routing system, (iii) a temperature in the gas-routing system, and (iv) a lambda value in the gas-routing system; and (iv) determining a fault of the component as a function of the measured state variable.

* * * * *